(12) United States Patent
Kanemura

(10) Patent No.: US 7,197,437 B2
(45) Date of Patent: Mar. 27, 2007

(54) METHOD, APPARATUS, AND COMPUTER PROGRAM FOR THE MONTE CARLO ION IMPLANTATION SIMULATION, AND SEMICONDUCTOR DEVICE MANUFACTURING METHOD BASED ON THE SIMULATION

(75) Inventor: Takahisa Kanemura, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 579 days.

(21) Appl. No.: 09/950,278

(22) Filed: Sep. 12, 2001

(65) Prior Publication Data

US 2002/0087297 A1 Jul. 4, 2002

(30) Foreign Application Priority Data

Sep. 11, 2000 (JP) .......................... P2000-275180

(51) Int. Cl.
| | |
|---|---|
| G06G 17/50 | (2006.01) |
| G06G 7/48 | (2006.01) |
| G06F 17/50 | (2006.01) |
| H01L 21/311 | (2006.01) |

(52) U.S. Cl. .................... 703/2; 703/6; 703/13; 438/17
(58) Field of Classification Search .................... 703/2, 703/6, 13; 73/436; 250/283; 438/17
See application file for complete search history.

(56) References Cited

U.S. PATENT DOCUMENTS 5,912,824 A * 6/1999 Sawahata ........................ 703/6

5,977,551 A 11/1999 Sawahata
6,099,574 A * 8/2000 Fukuda et al. ................. 703/14

FOREIGN PATENT DOCUMENTS

| JP | 8-139049 A | 5/1996 |
| JP | 10-135145 A | 5/1998 |

(Continued)

OTHER PUBLICATIONS

Yang, et al., "A More Efficient Approach for Monte Carlo Simulation Deeply-Channeled Implanted Profiles in Single-Crystal Silicon" Numerical Modeling of Process and Devices for Integrated Circuits 1994 p. 97-100.*

(Continued)

*Primary Examiner*—Paul Rodriguez
*Assistant Examiner*—Tom Stevens
(74) *Attorney, Agent, or Firm*—Foley & Lardner LLP

(57) ABSTRACT

A Monte Carlo ion implantation simulation method includes finding a unit cell in which an implanted trial particle is present, finding a basic cell in which the trial particle is present among basic cells that form the unit cell, finding a directional range in which the trial particle travels, obtaining collision candidate atoms with their locations from a database according to the found basic cell and directional range, setting a thermal vibration displacement for each of the collision candidate atoms that has not set thermal vibration displacement, calculating a collision parameter and free-flight distance for each of the collision candidate atoms, selecting, as a collision atom, one of the collision candidate atoms that has a collision parameter smaller than a predetermined maximum collision parameter and a smallest positive free-flight distance, and calculating a collision between the trial particle and the collision atom to find the after-collision location and momentum of the trial particle.

20 Claims, 12 Drawing Sheets

FOREIGN PATENT DOCUMENTS

| | | |
|---|---|---|
| JP | 11-54449 A | 2/1999 |
| JP | 11-111633 A | 4/1999 |

OTHER PUBLICATIONS

Gau et al., "A Study on Physical Models of Ion Implantations". Physical Science and Engineering) (Taiwan), vol. 19, p. 139-149, Mar. 1995.*

G. Hobler et al., "Acceleration of Binary Collision Simulations in Crystalline Targets Using Critical Angles for Ion Channeling", Nuclear Instruments and Methods in Physics Research B, vol. 102, (1995), pp. 24-28.

M. Posselt, "Crystal-Trim and its Application to Investigations on Channeling Effects During Ion Implantation", Radiation Effects and Defects in Solids, vol. 130-131, (1994), pp. 87-119.

* cited by examiner

TRAVELLING DIRECTION

METHOD, APPARATUS, AND COMPUTER PROGRAM FOR THE MONTE CARLO ION IMPLANTATION SIMULATION, AND SEMICONDUCTOR DEVICE MANUFACTURING METHOD BASED ON THE SIMULATION

CROSS REFERENCE TO RELATED APPLICATIONS

This application claims benefit of priority under 35 USC 119 to Japanese Patent Application No. P2000-275180 filed on Sep. 11, 2000, the entire contents of which are incorporated by reference herein.

BACKGROUND OF THE INVENTION

1. Field of the Invention

The present invention relates to a semiconductor process simulation. In particular, the present invention relates to a Monte Carlo simulation method for simulating an implanted ion distribution in a semiconductor substrate, a simulator for achieving the method, a computer program describing the method, and a semiconductor device manufacturing method including an ion implantation process based on the method.

2. Description of the Related Art

Development costs of LSIs (large-scale integrated circuits) are increasing, and to suppress the costs, improvements in the efficiency of LSI designing and development are strongly needed. The LSI designing and development need simulation techniques with quantifying capacities. Simulations required for semiconductor device design and development include a process simulation that simulates a semiconductor manufacturing process to estimate impurity distributions and element geometries in a semiconductor device and a device simulation that uses a result of the process simulation to estimate the electrical characteristics of the semiconductor device.

To simulate an ion implantation process of implanting impurity ions into a semiconductor device, a Monte Carlo simulation is frequently used. The Monte Carlo simulation approximates a two-body collision and is described in, for example, M. Posselt "Radiat. Eff. and Defects in Solids," 130–131, 87(1994). This paper discloses a method of determining collision conditions on trial particles in a silicon crystal. This method will briefly be explained. FIG. 1A shows a unit cell contained in a silicon crystal. This unit cell is one of unit cells that are regularly arranged to form a three-dimensional space in the silicon crystal. Due to this regularity, an atom of the silicon crystal that will collide with a trial particle implanted in the silicon crystal is uniquely determinable according to the location and travelling direction of the trial particle, assuming that the thermal vibration of each atom in the silicon crystal is negligible. The unit cell of FIG. 1A is divided into basic cells such as basic cells 16 and 17 shown in FIGS. 1B and 1C having different structures, and a list of relative locations of collision candidate atoms is prepared for each basic cell. A collision candidate atom is determined according to a maximum collision parameter "pmax." If pmax=d/2 (d being a lattice constant and corresponding to a side length of the unit cell of FIG. 1A), the basic cell 16 involves 17 collision candidate atoms as depicted with black, white, and hatched circles in FIG. 2A. Similarly, the basic cell 17 involves 18 collision candidate atoms as depicted with black, white, and hatched circles in FIG. 2B.

A technique of finding collision conditions on a trial particle according to the Monte Carlo simulation will be explained. A basic cell in which the trial particle is present is found. Based on this basic cell, a list of relative locations of collision candidate atoms is obtained from a database. Thermal vibration displacements are set for the collision candidate atoms. The thermal vibration displacements, if once set, are stored without future modification because a thermal vibration speed is very slow and negligible compared with a trial particle speed.

From the obtained collision candidate atoms, a collision atom is selected. To select the collision atom, a travelling direction indicating unit vector $\lambda$ of the trial particle, a relative vector x from the trial particle to a given collision candidate atom, a collision parameter $p=|x \times \lambda|$, and a free-flight distance $\eta=|x \cdot \lambda|$ are considered. If the collision parameter p of the collision candidate atom is smaller than a maximum collision parameter pmax and if the free-flight distance $\eta$ thereof is the smallest positive value, the collision candidate atom is the collision atom. In this way, a collision atom and collision conditions are obtained.

The location range of atoms to be set thermal vibration displacement, i.e., the range where collision candidate atoms are present will be explained. If a trial particle travels along basic cells that are in face-to-face contact with each other, a location range of atoms to be set thermal vibration displacement of d/2 in thickness will be defined around a basic cell in which the trial particle is present, as shown in FIG. 3. The location range of atoms 22 of FIG. 3 is orthogonal to the travelling direction of the trial particle that is in the hatched basic cell. The location range of atoms 22 is expressed as follows:

$$(5+\pi) \times (d/2)^2 \approx 8.14 \times (d/2)^2$$

If the trial particle moves to a basic cell that is adjacent to the present cell along a single side, the range 22 is expressed as follows:

$$(2+3\times 2^{1/2}+\pi) \times (d/2)^2 \approx 9.38 \times (d/2)^2$$

One problem of this technique is that it does not consider the travelling direction of the trial particle. Namely, the prior art automatically picks up, as a collision candidate atom, every atom that is within the range of a maximum collision parameter "pmax" even if the atom is not in the travelling direction of a given trial particle. The prior art has another problem that it does not consider the location of the trial particle in the basic cell. Namely, the prior art automatically sets a candidate atom picking range around a basic cell in which a trial particle is present without considering the location of the trial particle in the basic cell.

The Monte Carlo simulation examines many trial particles, and provides the distribution of the location where the particles stop. The simulation for one-dimensional structured target needs typically about 1–100 minutes. For two-dimensional simulation, the particles needs 100–10,000 times particles for one-dimension, therefore simulation time needs 100–10,000 times. For same reason, three-dimensional simulation needs further CPU time. That is, the two or three-dimensional simulation often needs several days even with the latest EWSs (engineering work station). There is a need to reduce simulation time. The present inventor recognized the fact that nearly half of a total simulation time is spent setting thermal vibration displacements and finding collision atoms and tried to reduce the number of collision candidate atoms for which thermal vibration displacements are set, to thereby minimize collision atom calculations and simulation time.

SUMMARY OF THE INVENTION

An object of the present invention is to provide a Monte Carlo ion implantation simulation method capable of minimizing collision atom finding calculations and a simulation time, a Monte Carlo simulator for achieving the method, a computer program for executing the method, and a storage medium for storing the program.

In order to accomplish the objects, a first aspect of the present invention provides a Monte Carlo ion implantation simulation method including inputting the structure of a target having a monocrystal area, ion implanting conditions, and the number of trial particles; implanting the trial particles into the target; finding, for each implanted trial particle that is in the monocrystal area, a unit cell in which the trial particle is present and finding a basic cell in which the trial particle is present among basic cells that form the unit cell; finding a directional range in which the trial particle travels; obtaining the locations of collision candidate atoms from a database according to the found basic cell and directional range; setting a thermal vibration displacement for each of the collision candidate atoms that has not set thermal vibration displacement; calculating a collision parameter and free-flight distance for each of the collision candidate atoms; selecting, as a collision atom, one of the collision candidate atoms that has a collision parameter smaller than a predetermined maximum collision parameter and a smallest positive free-flight distance; and calculating a collision between the trial particle and the collision atom to find the after-collision location and momentum of the trial particle.

The first aspect divides each unit cell of a target into basic cells, locates a trial particle in one of the basic cells, and identifies a directional range in which the trial particle travels. This technique reduces the number of collision candidate atoms to be obtained from a database, minimizes a collision atom finding time to about half of a conventional simulation time, and improves simulation efficiency.

A second aspect of the present invention provides a Monte Carlo ion implantation simulator having an input device for entering the structure of a target having a monocrystal area, ion implanting conditions, and the number of trial particles; an initiator for implanting the trial particles into the target; a locator for finding, for each implanted trial particle that is in the monocrystal area, a unit cell in which the trial particle is present and finding a basic cell in which the trial particle is present among basic cells that form the unit cell; a direction finder for finding a directional range in which the trial particle travels; a database storing the locations of atoms in basic cells; a candidate selector for obtaining the locations of collision candidate atoms from the database according to the found basic cell and directional range; a displacement setter for setting a thermal vibration displacement for each of the collision candidate atoms that has not set thermal vibration displacement; a parameter calculator for calculating a collision parameter and free-flight distance for each of the collision candidate atoms; a collision atom selector for selecting, as a collision atom, one of the collision candidate atoms that has a collision parameter smaller than a predetermined maximum collision parameter and a smallest positive free-flight distance; and a collision calculator for calculating a collision between the trial particle and the collision atom to find the after-collision location and momentum of the trial particle.

According to the second aspect, each unit cell of a target is divided into basic cells, the locator locates a trial particle in one of the basic cells, and the direction finder finds a directional range in which the trial particle travels. This technique reduces the number of collision candidate atoms to be obtained from a database, minimizes a collision atom finding time that takes about half of a simulation time, and improves simulation efficiency.

A third aspect of the present invention provides a computer program for executing the Monte Carlo ion implantation simulation method of the first aspect.

The computer program executes entering the structure of a target having a monocrystal area, ion implanting conditions, and the number of trial particles; implanting the trial particles into the target; finding, for each implanted trial particle that is in the monocrystal area, a unit cell in which the trial particle is present and finding a basic cell in which the trial particle is present among basic cells that form the unit cell; finding a directional range in which the trial particle travels; obtaining the locations of collision candidate atoms from a database according to the found basic cell and directional range; setting a thermal vibration displacement for each of the collision candidate atoms that has not set thermal vibration displacement; calculating a collision parameter and free-flight distance for each of the collision candidate atoms; selecting, as a collision atom, one of the collision candidate atoms that has a collision parameter smaller than a predetermined maximum collision parameter and a smallest positive free-flight distance; and calculating a collision between the trial particle and the collision atom to find the after-collision location and momentum of the trial particle.

A fourth aspect of the present invention provides a semiconductor device manufacturing method including an ion implantation process to be carried out according to data provided by the Monte Carlo ion implantation simulation method of the first aspect.

Namely, the fourth aspect employs the Monte Carlo ion implantation simulation method that includes entering the structure of a target having a monocrystal area, ion implanting conditions, and the number of trial particles; implanting the trial particles into the target; finding, for each implanted trial particle that is in the monocrystal area, a unit cell in which the trial particle is present and finding a basic cell in which the trial particle is present among basic cells that form the unit cell; finding a directional range in which the trial particle travels; obtaining the locations of collision candidate atoms from a database according to the found basic cell and directional range; setting a thermal vibration displacement for each of the collision candidate atoms that have not set thermal vibration displacement; calculating a collision parameter and free-flight distance for each of the collision candidate atoms; selecting, as a collision atom, one of the collision candidate atoms that has a collision parameter smaller than a predetermined maximum collision parameter and a smallest positive free-flight distance; and calculating a collision between the trial particle and the collision atom to find the after-collision location and momentum of the trial particle. The fourth aspect calculates an implanted ion distribution in a semiconductor device according to data provided by the Monte Carlo ion implantation simulation method, designs process conditions for the semiconductor device according to the implanted ion distribution, and carries out a series of wafer processes including an ion implanting process according to the designed process conditions.

The fourth aspect greatly shortens a process condition designing time. A result of the Monte Carlo ion implantation simulation may be fed back to the designing, to minimize errors in the designing. The fourth aspect shortens semiconductor device designing and development periods.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

DESCRIPTION OF THE PREFERRED EMBODIMENTS

Figure 1A:
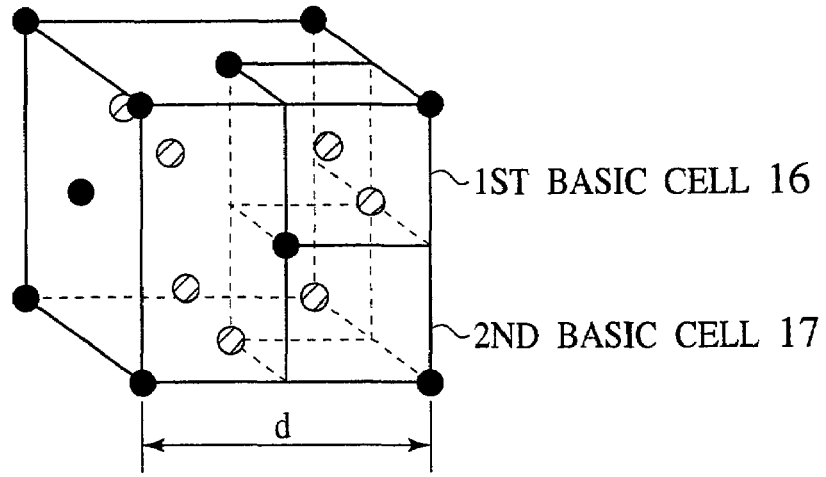
FIG. 1A is a perspective view showing atoms in a unit cell of a silicon monocrystal having a diamond structure.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Technique of Finding Collision Atom

A technique of finding a collision atom in a Monte Carlo ion implantation simulation will briefly be explained. The technique uses trial particles to describe real atoms implanted into a target having a monocrystal area, to determine collision conditions between the trial particles and the target's crystal atoms according to random numbers, to calculate collisions between the trial particles and the crystal atoms, to find a distribution of the stationary locations of the trial particles, and extracts an implanted atom distribution in the target. Each collision calculation is based on a two-body collision approximation between a trial particle and a crystal atom. This technique is capable of correctly estimating a real distribution of implanted atoms.

Figure 4:
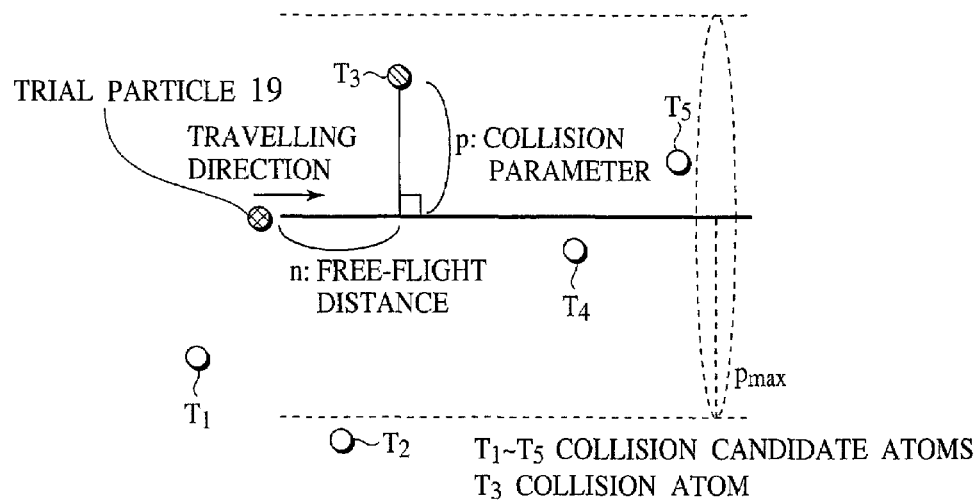
FIG. 4 explains a technique of finding an atom that will collide with a trial particle.

A crystal atom (collision atom) that collides with a trial particle has a collision parameter p that is smaller than a maximum collision parameter pmax and a smallest positive free-flight distance η. FIG. 4 shows a technique of selecting a collision atom that will collide with a trial particle 19 from among collision candidate atoms T1 to T5. Taking the atom T3 as an example, it has a collision parameter p that is equal to the length of a perpendicular extended from the atom T3 to a travelling direction line of the trial particle 19 and a free-flight distance η that is a distance from the trial particle 19 to a foot of the perpendicular extended from the atom T3. Among the atoms T1 to T5, the atoms T3, T4, and T5 have collision parameters that are each smaller than the maximum collision parameter pmax and positive free-flight distances. Among the atoms T3, T4, and T5, the atom T3 has a smallest positive free-flight distance. As a result, the atom T3 is selected as a collision atom that will collide with the trial particle 19. If a target to which trial particles are implanted is a silicon crystal having a diamond crystal structure, the collision atom finding technique mentioned above is carried out by employing thermal vibration displacements for silicon atoms that form the silicon crystal.

Figure 5:
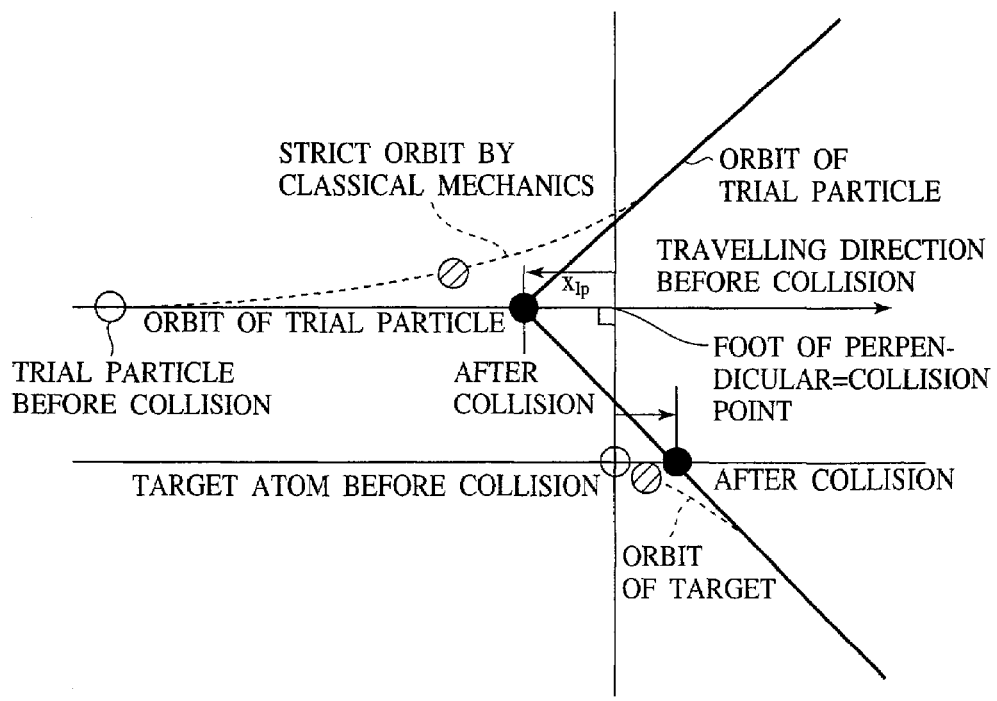
FIG. 5 explains a collision point between a trial particle and a collision atom.

FIG. 5 explains a collision point between a trial particle and a collision atom. A curve shown in FIG. 5 represents an orbit of the trial particle on collision with a target's atom based on classical mechanics. This curve is approximated by a polygonal line made of two asymptotes. A location of the trial particle after the collision is approximated from a bending point of the polygonal line. This bending point is approximated from the foot of a perpendicular extended from the collision atom to a travelling direction line of the trial particle before a collision. Namely, a distance "xlp" in FIG. 5 is approximated as zero, and a collision point between a trial particle and a collision atom is defined as the foot of a perpendicular extended from the collision atom to a travelling direction line of the trial particle before a collision. Also, a free-flight distance is defined as a distance from the trial particle to the collision point.

Embodiments of the present invention will be explained. In the embodiments, a target to which ions (trial particles) are implanted includes a semiconductor substrate or an epitaxial layer of a semiconductor monocrystal formed on a semiconductor substrate.

Throughout the drawings referred in the following explanation, like reference marks represent like parts. In flowcharts shown in the drawings, like step numbers represent like steps.

First Embodiment

Figure 6:
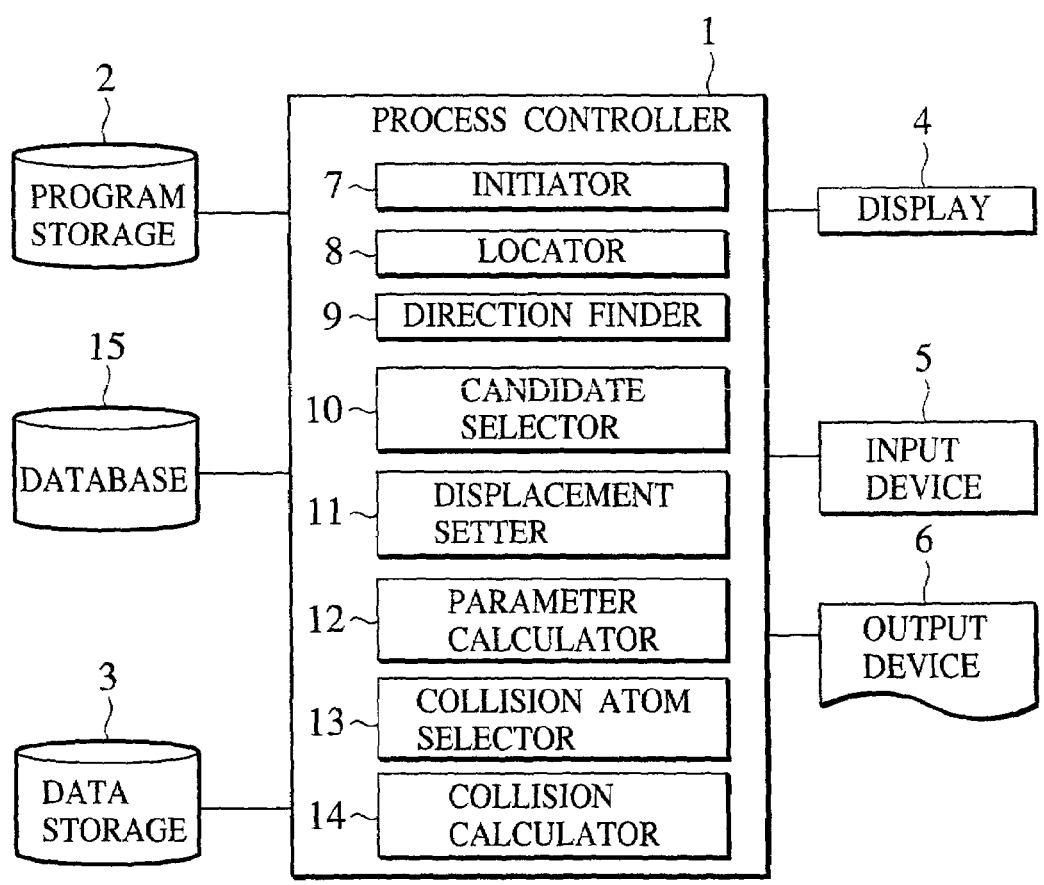
FIG. 6 is a block diagram showing a Monte Carlo ion implantation simulator according to an embodiment of the present invention.

FIG. 6 is a block diagram showing a Monte Carlo ion implantation simulator according to an embodiment of the present invention. The simulator has a process controller 1, program storage 2, a database 15, data storage 3, a display 4, an input device 5, and an output device 6.

The process controller 1 has an initiator 7, a locator 8, a direction finder 9, a candidate selector 10, a displacement setter 11, a parameter calculator 12, a collision atom selector 13, and a collision calculator 14. When starting a simulation, an operator uses the input device 5 to enter the structure of a target having a monocrystal area, ion implanting conditions, and the number of trial particles. According to the entered data, the initiator 7 implants the trial particles into the target and starts a series of simulation operations. The locator 8 finds a unit cell in which a given trial particle is present among unit cells that from the target, and identifies a basic cell in which the trial particle is present among basic cells that form the unit cell in question. The direction finder 9 finds a travelling direction range of the trial particle. The candidate selector 10 obtains collision candidate atoms from the database 15 according to the found basic cell and travelling direction range. The displacement setter 11 sets a thermal vibration displacement for each obtained collision candidate atom that has not set thermal vibration displacement. The parameter calculator 12 calculates a collision parameter p and free-flight distance η for each obtained collision candidate atom with a thermal vibration displacement. The collision atom selector 13 selects, as a collision atom, one of the obtained collision candidate atoms that has a collision parameter smaller than a maximum collision parameter "pmax" and a smallest positive free-flight-distance. The collision calculator 14 calculates a collision between the collision atom and the trial particle and finds the after-collision location and momentum of the trial particle.

The database 15 the stores locations of atoms determined by the found basic cell and the directional range. The program storage 2 stores a series of simulation programs. The data storage 3 stores manufacturing processes and basic data used by the process controller 1, the data stored in the data storage 3 including thermal vibration displacements set by the displacement setter 11. The display 4 is a graphic monitor terminal to display, for example, an implanted ion distribution based on a simulation result. An operator may observe simulation results on the display 4. The output device 6 stores simulation results such as target structures and implanted ion distributions in external files and prints them on sheets of paper.

The Monte Carlo ion implantation simulator of the present invention receives the structure of a target, ion implanting conditions, etc., related to an ion implantation process and calculates, for example, an implanted impurity distribution that may occur in the target during the ion implantation process. The ion implantation process is included in a series of semiconductor device manufacturing processes and involves a low-concentration ion implantation to adjust the threshold voltage of each field-effect transistor and a high-concentration ion implantation to form electrode regions. In this way, the ion implantation process involves various conditions. The Monte Carlo ion implantation simulator of the present invention may be a part of a general-purpose process simulator used to carry out process simulations when designing and manufacture a semiconductor device. The process simulator receives data related to manufacturing processes including ion implantation, oxidation, thermal diffusion, etching, and patterning and estimates the structure and impurity distribution of a semiconductor device in each process. The process simulator may temporarily store calculation results in external files, read the stored results, and further carry out calculations. Based on a result of the process simulation, a device simulation is carried out to calculate the electric characteristics of the semiconductor device.

Figure 7:
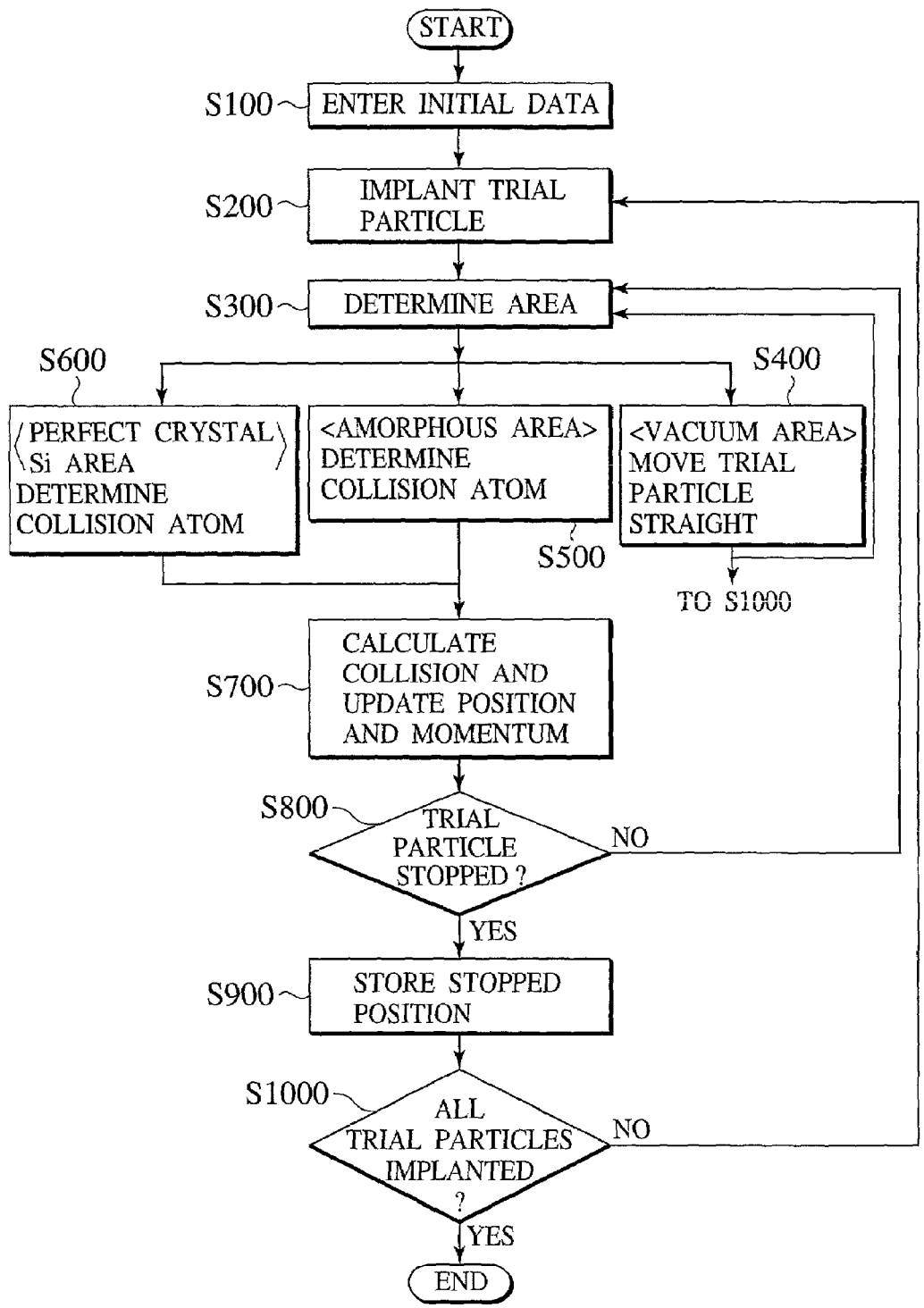
FIG. 7 is a flowchart outlining a Monte Carlo ion implantation simulation method according to a first embodiment of the present invention.

FIG. 7 is a flowchart generally showing a Monte Carlo ion implantation simulation method according to the first embodiment of the present invention.

(i) In step S100, the input device 5 is used to enter the structure of a target having a monocrystal area, ion implanting conditions, and the number of trial particles to be implanted into the target. The target structure may be a three-dimensional structure made of silicon crystals and other matter usually observed during semiconductor device manufacturing processes. To shorten a computation time, the target structure may be a one-or two-dimensional structure. The ion implanting conditions include ion implanting energy, implantation concentrations, implanting angles, etc. The trial particles must represent a large number of actual atoms to be implanted, and therefore, the number of the trial particles must correlate to the number of actually implanting atoms. If the number of the trial particles is small, a computation time will be short but an implanted distribution to be obtained will not be smooth to low concentrations. If the number of the trial particles is large, a long computation time is needed. It is preferable to enter an appropriate number of trial particles in consideration of various conditions. It is possible to automatically set a typical number of trial particles.

(ii) In step S200, the initiator 7 implants one of the trial particles into the target according to conditions such as implanting energy and implanting angles entered in step S100. The implanting location of each trial particle on the target is determined according to a random number so that the trial particles are implanted over an ion beam irradiating plane. To calculate the shadow of the target by an ion beam, the implanting locations of the trial particles must be above the top of the target. Step S200 is repeated until all of the trial particles are implanted into the target.

(iii) Step S300 determines the location of the implanted trial particle. If the trial particle is present in a vacuum area, step S400 is carried out. If the trial particle is in an amorphous area of the target, step S500 is carried out If the trial particle remains in a silicon substrate or a monocrystal area (perfect crystal silicon) such as an epitaxial layer, step S600 is carried out.

(iv) Step S400 advances the trial particle until it exits the vacuum area. Then, step S300 is carried out. If the trial particle is indefinitely in the vacuum area due to reflection or passage through the target, the calculation of this trial particle is terminated and step S1000 is carried out.

(v) Step S500 sets a collision atom in the amorphous area. This is described in J. P. Biersack and L. G. Haggmark "Nucl. Inst. Meth.," 257,814(1980). The detailed explanation of this is omitted because this is unrelated to the present invention.

(vi) Step S600 determines a collision atom in the monocrystal area. If the monocrystal area includes crystal defects, it is handled as an amorphous area in proportion to a concentration of the crystal defects. This handling is similar to step S500. This embodiment determines a collision atom in a perfect silicon crystal.

(vii) In step S700, the collision calculator 14 calculates a collision between the trial particle and the collision atom and updates date about the location and momentum of the trial particle.

(viii) Step S800 checks to see if the trial particle has stopped after the collision. If step S800 is "NO," step S300 is carried out. If step S800 is "YES," step S900 is carried out.

(ix) Step S900 stores the stopped location of the trial particle in the data storage 3. If the stopped location of every trial particle is directly stored in the data storage 3, the data storage 3 must have a large storage area. To reduce the storage area required, discrete areas are prepared for the target, and a concentration is set for each discrete area. When a trial particle stops a discrete area, a concentration increment of the discrete area is obtained by dividing the number of actual atoms which the trial particle represents by the volume of the area.

(x) Step S1000 checks to see if all of the trial particles have been processed, i.e., if all of the trial particles have been implanted into the target. If step S1000 is "NO," step S200 is repeated. If step S1000 is "YES," the simulation ends.

Figure 8:
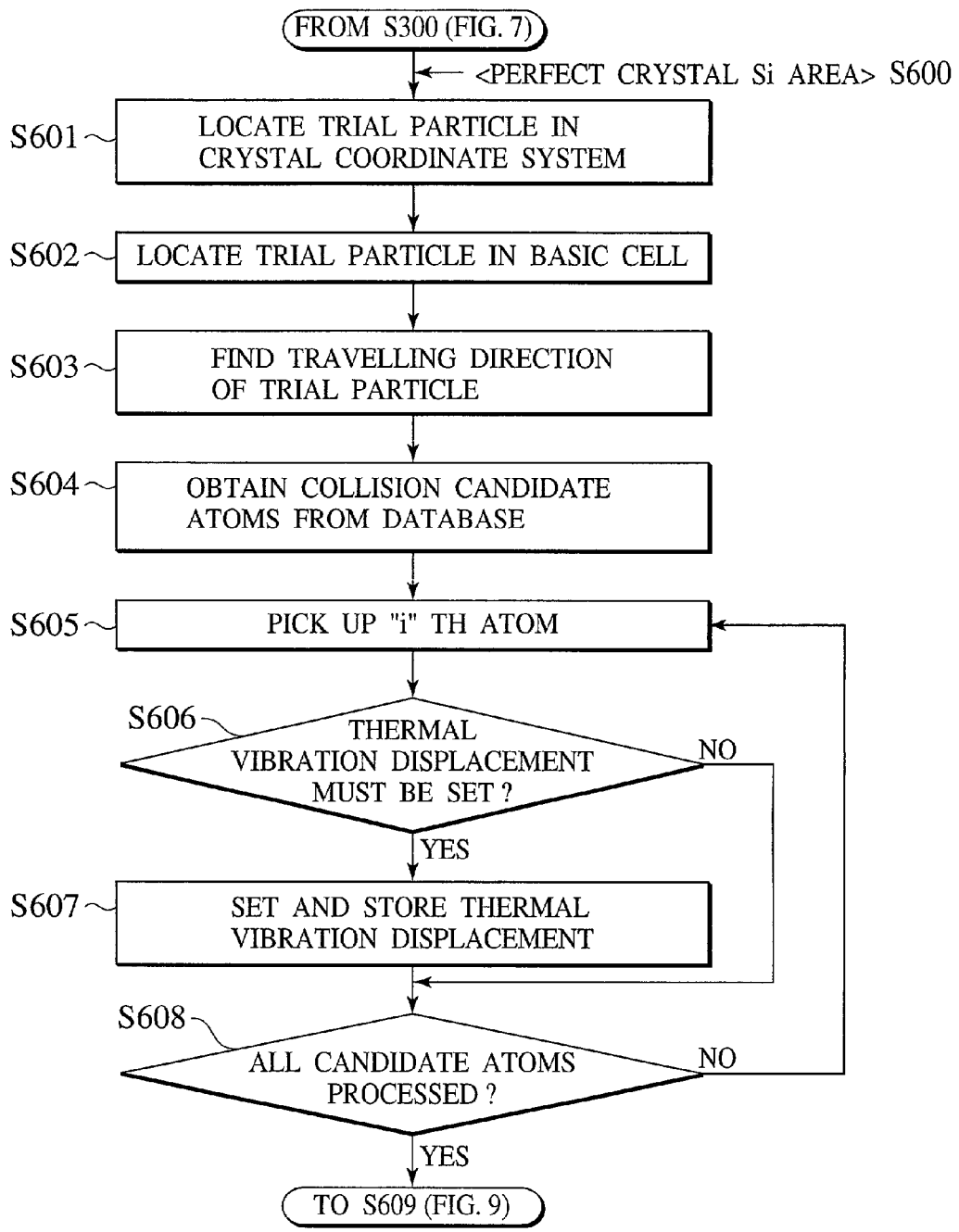
FIGS. 8 and 9 are flowcharts showing the details of step S600 of FIG. 7.
Figure 9:
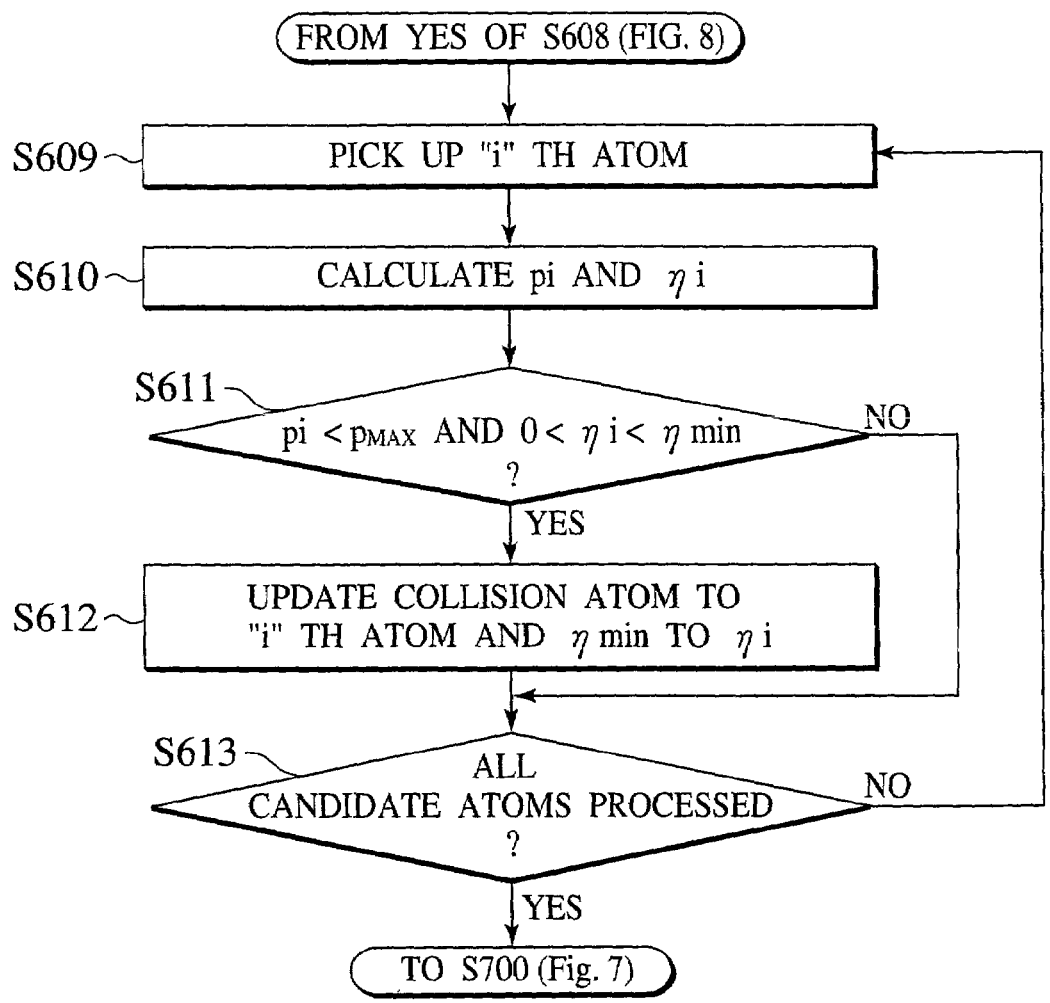

FIGS. 8 and 9 show the details of step S600 of FIG. 7. The flowchart in FIG. 8 is continued in the flowchart in FIG. 9 to complete step S600.

(1) Step S601 of FIG. 8 follows on from step S300 of FIG. 7 and determines the location of the implanted trial particle in a crystal coordinate system. Generally, the location of a trial particle is found with a simulation coordinate system that represents the shape of a target. For the examines of the material region or the diffusion region where the trial particle placed like as step S300, S900, generally the location of a trial particle is found with a simulation coordinate system that represents the shape of a target. In this embodiment, however, the location of a trial particle is defined in a crystal coordinate system to easily calculate the relative location of the trial particle with respect to a crystal atom. In the crystal coordinate system, the location of a trial particle is expressed with three basic vectors a, b, and c having lengths along three sides of a crystal unit cell. Namely, a trial particle location P is expressed as follows:

$$P = jxa + kxb + mxc \quad (1)$$

where jx, kx, and mx are real numbers. To minimize truncation errors in numerical calculation, an origin is set around an implanting point P0 which is expressed as follows:

$$P0 = jx0a + kx0b + mx0c \quad (2)$$

where jx0, kx0, and mx0 are uniform random numbers that are greater than 0 and smaller than 1.

A vibration center Tijkm of a crystal atom contained in the target is expressed as follows:

$$Tijkm = ti + ja + kb + mc \quad (3)$$

where i is one of integers ranging from 1 to the number of atoms contained in a unit cell, and j, k, and m are arbitrary integers. In a silicon crystal, ti may be as follows:

$$t1 = 0/4a + 0/4b + 0/4c \quad (4)$$

$$t2 = 1/4a + 1/4b + 1/4c \quad (5)$$

$$t3 = 2/4a + 2/4b + 0/4c \quad (6)$$

$$t4 = 3/4a + 3/4b + 1/4c \quad (7)$$

$$t5 = 0/4a + 2/4b + 2/4c \quad (8)$$

$$t6 = 1/4a + 3/4b + 3/4c \quad (9)$$

$$t7 = 2/4a + 0/4b + 2/4c \quad (10)$$

$$t8 = 3/4a + 1/4b + 3/4c \quad (11)$$

Figure 1B:
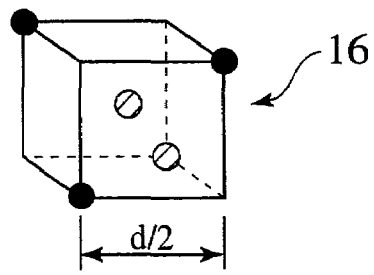
FIG. 1B is a perspective view showing atoms in a first basic cell whose side length is half a lattice constant.
Figure 1C:
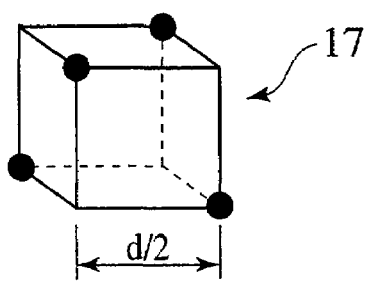
FIG. 1C is a perspective view showing atoms in a second basic cell whose side length is half the lattice constant.

(2) Step S602 determines a basic cell in which the implanted trial particle is present. Each unit cell contained in the target is divided into basic cells by dividing each side of the unit cell by 8. Namely, each unit cell is divided into $8^3$ basic cells. On the other hand, the prior art of M. Posselt "Radiat. Eff. and Defects in Solids," 130–131, 87(1994) divides each unit cell into $2^3$ basic cells by halving each side of the unit cell, as shown in FIG. 1A. In this case, each basic cell has one of the two structures shown in FIGS. 1B and 1C. A list of collision candidate atoms is prepared for each basic cell and is used in step S604 to be explained later. Accordingly, the number of atoms in each basic cell of the present invention that divides each unit-cell side by 8 is smaller than that of the prior art that divides each unit-cell side by 2. Namely, the present invention involves a shorter computation time than the prior art. However, if each unit cell is divided into basic cells that are too small compared with a predetermined thermal vibration displacement Vm shown in step S604, the number of atoms involved will not be reduced, and instead, the number of basic-cell types will be increased to require a larger memory area. It is appropriate, therefore, to divide each side of each unit cell by 8 in the case of a silicon monocrystal.

Figure 10:
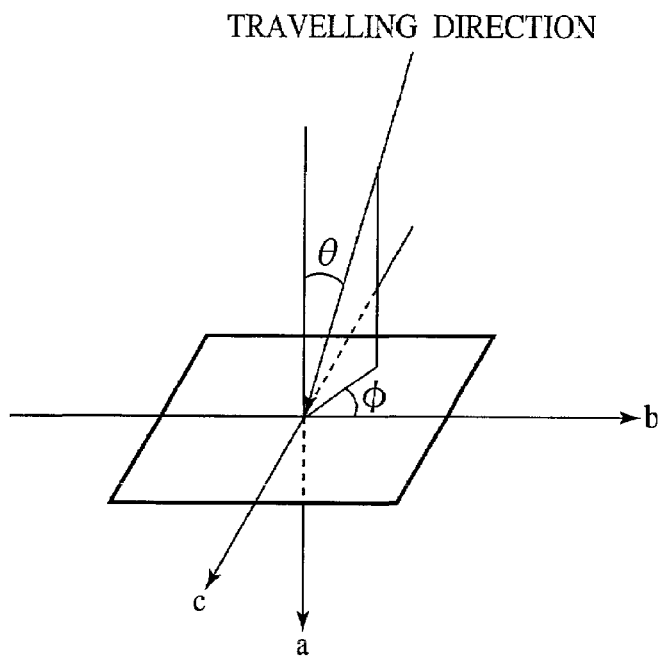
FIG. 10 shows a polar coordinate system for defining a directional range in which a trial particle travels.

(3) Step S603 finds a directional range for a unit vector λ of traveling direction of the trial particle. For example, as is shown in FIG. 10, a polar coordinate system having a polar axis along an a-axis is defined, and directional ranges each having an azimuth φ of 45 degrees and a radial angle θ of 45 degrees are set. Then, one of the directional ranges in the polar coordinate system is selected for the unit vector λ. The polar coordinate system may be fixed to a simulation coordinate system. It is preferable to fix the polar coordinate system to the crystal coordinate system because a list of collision candidate atoms to be obtained from the data base 15 in step S604 is fixed.

Figure 2A:
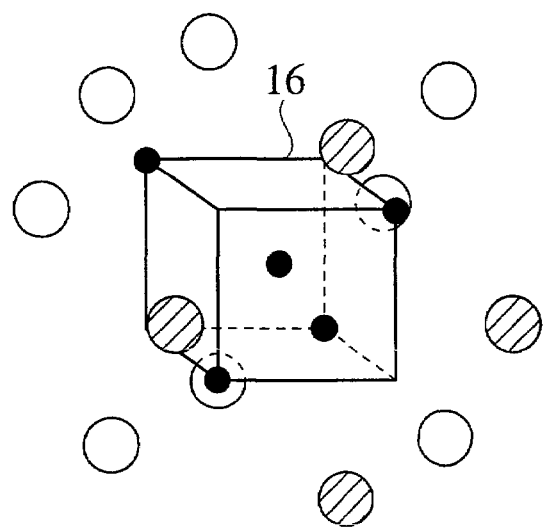
FIG. 2A is a perspective view showing collision candidate atoms with a trial particle being in the first basic cell.
Figure 2B:
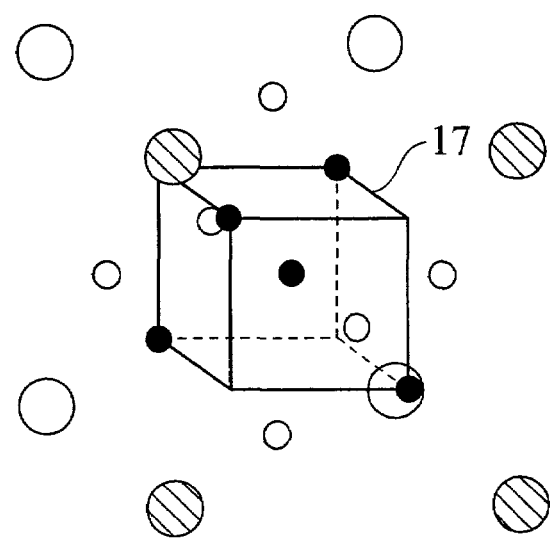
FIG. 2B is a perspective view showing collision candidate atoms with a trial particle being in the second basic cell.

(4) Step S604 obtains a list of the locations of collision candidate atoms, using the basic cells involving the trial particle which is obtained in S602, the directional range which is obtained in S603 and database 15. Database 15 has lists of the atoms that may be collided by the trial particles at inside the basic cell for each combination case of the basic cell and the range of traveling direction of the trail particles. If the collision candidate atoms are defined as atoms having collision points within the basic cell, they are present in an area defined by the basic cell plus a width of "pmax+Vm" where pmax is a maximum collision parameter that is usually equal to "d/2" with d being a lattice constant corresponding to a side length of a unit cell, and Vm is a predetermined large thermal vibration displacement. If the basic cell in which the trial particle is present is the basic cell 16 of FIG. 1B, there are 17 collision candidate atoms as shown in FIG. 2A. If the basic cell in which the trial particle is present is the basic cell 17 of FIG. 1C, there are 18 collision candidate cells as shown in FIG. 2B. If the size of each basic cell is reduced, the number of collision candidate atoms will be reduced. By combining the directional range of the trial particle with the basic cell in which the trial particle is present, the present invention reduces the number of collision candidate atoms.

(5) Step S605 selects an "i" th atom from among the collision candidate atoms. If there are n collision candidate atoms that are numbered from 1 to n, step S605 picks up in sequence the collision candidate atoms 1 to n.

(6) Step S606 checks to see if the collision candidate atom i has not set thermal vibration displacement If step S606 is "YES" to indicate that the collision candidate atom i has not set thermal vibration displacement, step S607 is carried out. If step S606 is "NO" to indicate that the collision candidate atom i has a thermal vibration displacement Di, step S608 is carried out The thermal vibration speed of an atom is negligible compared with the speed of the trial particle, and therefore, a thermal vibration displacement set for an atom is unchanged once it is set. To achieve this, a once set thermal vibration displacement is stored in the data storage 3 (FIG. 6). A range of atoms for which thermal vibration displacements must be stored for satisfactory calculation results is a cubic range having a side length of about 1.5 d (d being a lattice constant and corresponding to a side length of a unit cell) defined around a given trial particle. Naturally, the above conservation of thermal vibration displacement must be done, even case that the trial particle moves to the neighbor basic cell.

(7) In step S607, the displacement setter 11 sets a thermal vibration displacement Di for the collision candidate atom i and stores the thermal vibration displacement Di in the data storage 3.

(8) Step S608 checks to see if every one of the obtained collision candidate atoms has been picked up in step S605. In other words, step S608 determines whether or not each of the obtained collision candidate atoms 1 to n has been processed. If step S608 is "NO," step S605 is repeated by selecting the next collision candidate atom as a collision candidate atom i. If step S608 is "YES," step S609 of FIG. 9 is carried out.

The loop from step S605 to step S608 is repeated to set a thermal vibration displacement for each of the collision candidate atoms obtained from the data base 15 and having not set thermal vibration displacement. The thermal vibration displacement of any collision candidate atom selected in step S606 is read out of the data storage 3.

(9) Step S609 of FIG. 9 again picks up a collision candidate atom i from among the collision candidate atoms obtained from the database 15.

(10) Step S610 calculates a collision parameter pi and free-flight distance ηi for the collision candidate atom i as follows:

$$pi = |(Ti + Di - P) \times \lambda|$$

$$\eta i = |(Ti + Di - P) \cdot \lambda|$$

where Ti+Di is the location of the collision candidate atom i, and λ is a unit vector in the travelling direction of the trial particle.

(11) Step S611 checks to see if the calculated collision parameter pi is positive and smaller than a predetermined maximum collision parameter pmax and if the calculated free-flight distance ηi is smaller than a smallest free-flight distance ηmin. If step S611 is "YES," step S612 is carried out. If step S611 is "NO," step S613 is carried out.

(12) Step S612 updates a collision atom to the atom i and the minimum free-flight distance ηmin to the free-flight distance ηi. This means that, if pi<pmax and 0<ηi<ηmin in step S611, step S612 updates the stored collision atom to the "i" th atom and stores ηmin=ηi.

(13) Step S613 checks to see if every collision candidate atom has been picked up in step S609. Namely, step S613 checks to see if every one of the obtained collision candidate atoms 1 to n has been processed. If step S613 is "NO," step S609 is repeated to pick up the next collision candidate atom as a collision candidate atom i to process. If step S613 is "YES," step S700 of FIG. 7 is carried out.

The loop from step S609 to step S613 is repeated to calculate a collision parameter p and free-flight distance η for every collision candidate atom obtained from the database 15. Also, the loop finds, among the collision candidate atoms obtained from the database 15, a collision atom having a collision parameter that is smaller than the predetermined maximum collision parameter pmax and a smallest free-fight distance. For example, among the collision candidate atoms T1 to T5 of FIG. 4, the atom T3 having the smallest free-flight distance and a collision parameter smaller than the maximum collision parameter pmax is selected as a collision atom.

In this way, the first embodiment divides each unit cell in a target silicon crystal into basic cells each having a side length that is one eighth of a lattice constant d, and the locator 8 specifies a basic cell in which a trial particle is present Then, the direction finder 9 determines a directional range in which the trial particle travels. The first embodiment is capable of reducing the number of collision candidate atoms to 62% of the prior art. Namely, the first embodiment is capable of reducing the number of atoms to which thermal vibration displacements are set to 62% of the prior art. Consequently, the first embodiment greatly shortens a candidate atom obtaining time that takes nearly half of simulation time, thus improving simulation efficiency.

Although the first embodiment sets the side length of a basic cell to d/8, this does not limit the present invention. The side length of a basic cell is optional, or may be entered by an operator in step S100 of FIG. 7 together with the structure of a target, implanting conditions, and the number of trial particles. Although the first embodiment determines the travelling direction of a trial particle according to directional ranges each of 45 degrees, this does not limit the present invention. Each directional range may have an optional angle, or it may be set by an operator.

Second Embodiment

According to the first embodiment, collision candidate atoms obtained from the database 15 in step S604 have each a collision point in a basic cell in which a trial particle is present. It is not always true that a collision atom is found among the collision candidate atoms that have each a collision point within a basic cell where a trial particle is present. To cope with this problem, the second embodiment of the present invention additionally obtains collision candidate atoms that have each a collision point outside a basic cell in which a trial particle is present. The second embodiment employs the Monte Carlo ion implantation simulator of FIG. 6. The candidate selector 10 of the second embodiment obtains, according to a basic cell in which a trial particle is present and the travelling direction of the trial particle, not only collision candidate atoms that each have a collision point within the basic cell but also collision candidate atoms that each have a collision point outside the basic cell. Other arrangements and operations of the second embodiment are the same as those in the first embodiment.

According to the second embodiment, collision candidate atoms obtained from the database 15 include atoms that are out side a basic cell where a trial particle is present. Namely, the collision candidate atoms are found according to the location of the basic cell (step S602) and the travelling direction of the trial particle (step S603) and include:

(a) any atom having a thermal vibration center T that always collides with the trial particle if the thermal vibration displacement of the atom is smaller than a predetermined large thermal vibration displacement Vm, i.e., any atom whose collision parameter p satisfies "p<pmax−Vm" (pmax being a maximum collision parameter) and whose free-flight distance η satisfies "η>Vm" and is equal to a smallest free-flight distance ηmin (η=ηmin), and (b) any atom having a thermal vibration center T that has a possibility of collision with the trial particle if the thermal vibration displacement of the atom is smaller than Vm, i.e., any atom whose collision parameter p satisfies "p<pmax+Vm" and whose free-flight distance n satisfies "−Vm<η<ηmin+Vm."

If Vm is d/10 (d being a lattice constant corresponding to the side length of a unit cell) and the side length of a basic cell is d/8, the number of collision candidate atoms to be obtained will be 11 in average, and a collision atom will always be found in a single obtaining operation.

To find collision candidate atoms that have collision points outside a basic cell where a trial particle is present, adjacent basic cells must be checked. To check such adjacent basic cells simultaneously, the second embodiment prepares collision-candidate-atom lists of collision candidate atoms including those having collision points outside a basic cell in question. With this technique, the second embodiment can efficiently find a collision atom.

Although the second embodiment sets the predetermined large thermal vibration displacement Vm as d/10, this does not limit the present invention. The value Vm may be optional, or may be set by an operator in step S100.

Third Embodiment

Figure 11:
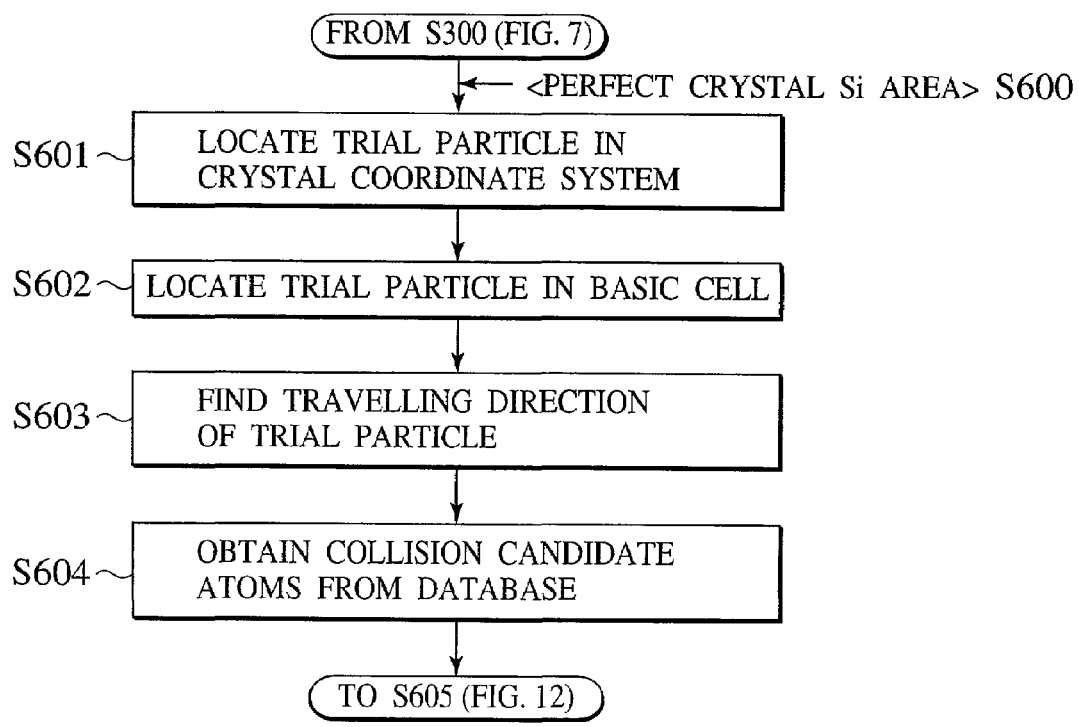
FIGS. 11 and 12 are flowcharts showing the details of step S600 of FIG. 7 according to a third embodiment of the present invention.
Figure 12:
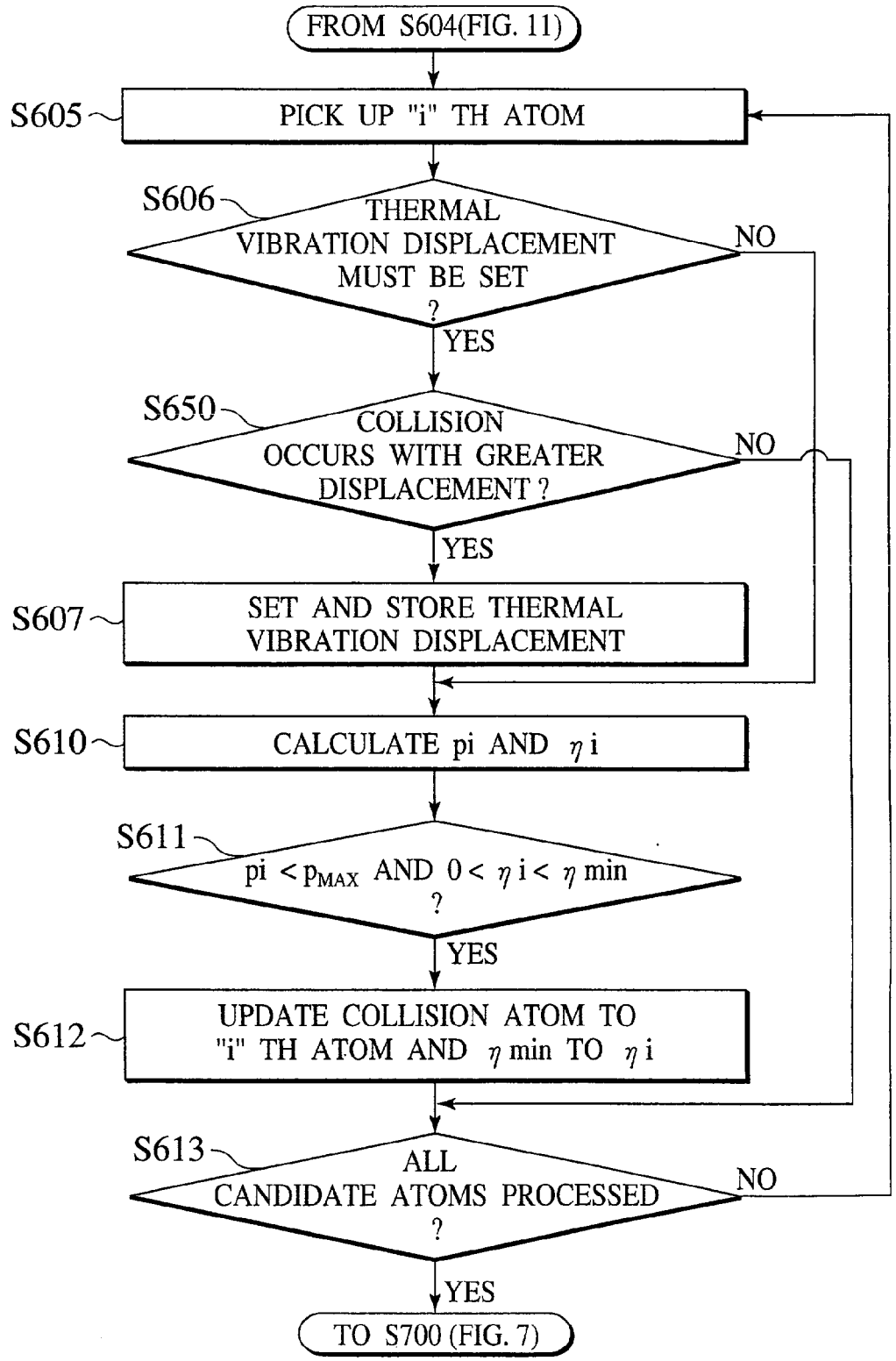

FIGS. 11 and 12 are flowcharts showing a Monte Carlo ion implantation simulation method according to the third embodiment of the present invention. This embodiment relates to step S600 of FIG. 7. The flowchart of FIG. 11 continues to the flowchart of FIG. 12. In FIGS. 11 and 12, the same steps as those of FIGS. 8 and 9 are represented with like step numbers.

(I) After step S300 of FIG. 7, step S601 of FIG. 11 locates the implanted trial particle in a crystal coordinate system.

(II) Step S602 determines a basic cell in a unit cell where the trial particle is present.

Here, each unit cell is divided into $8^3$ basic cells by dividing each side of each unit cell by eight.

(III) Step S603 finds a directional range of the unit vector λ of the trial particle.

(IV) Step S604 obtains the locations of collision candidate atoms from the database 15 according to the basic cell found in step S602 and the directional range found in step S603.

(V) Step S605 of FIG. 12 picks up a collision candidate atom i from the obtained collision candidate atoms.

(VI) Step S606 checks to see if the collision candidate atom i has any thermal vibration displacement. If step S606 is "YES," step S650 is carried out. If step S606 is "NO," step S610 is carried out.

(VII) Step S650 checks to see if the collision candidate atom i with no setting thermal vibration displacement has a possibility of hitting the trial particle if a thermal vibration displacement smaller than a predetermined large thermal vibration displacement Vm is set for the atom i. If step S650 is "YES," step S607 is carried out. If step S650 is "NO," step S613 is carried out.

Figure 3:
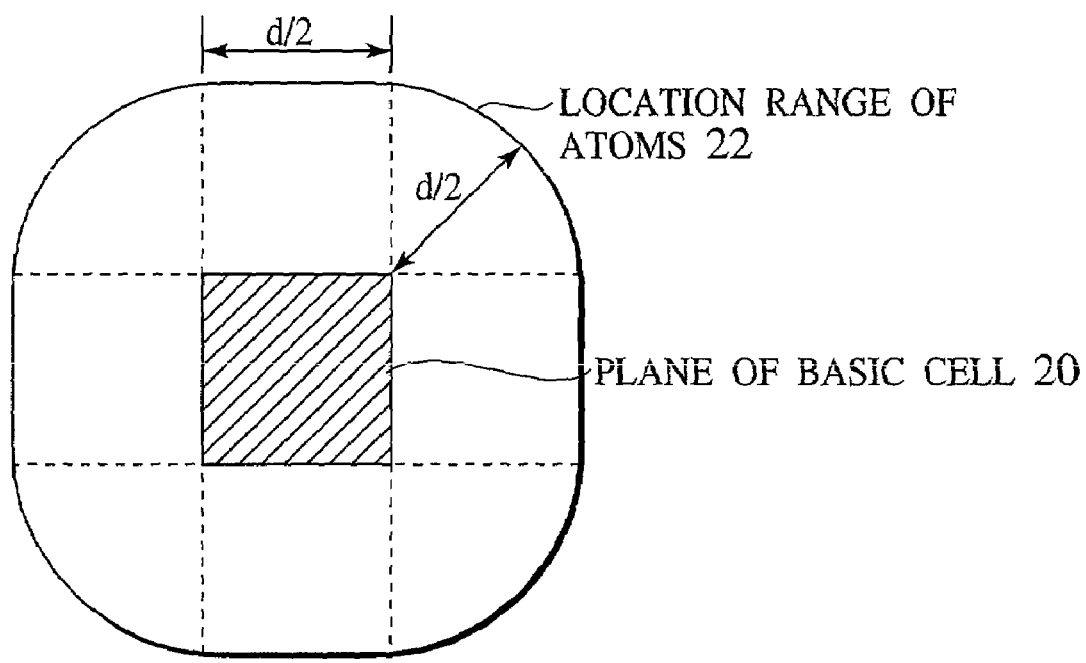
FIG. 3 shows a location range of atoms to be set thermal vibration displacement according to a related art.
Figure 13:
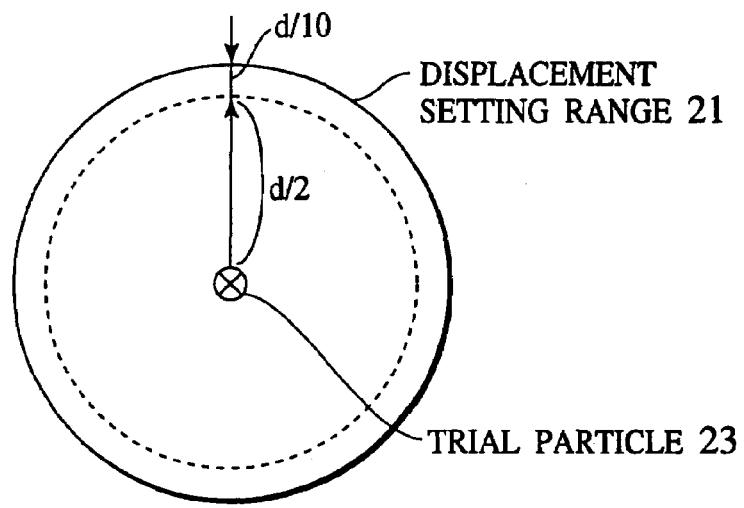
FIG. 13 shows a thermal vibration displacement setting range according to the third embodiment.

More precisely, step S650 checks to see if a collision parameter $p=|(T-P)\times\lambda|$ of the collision candidate atom i satisfies "p<pmax+Vm" and if a free-flight distance $\eta=|(T-P)\cdot\lambda|$ satisfies "−Vm<η<ηmin+Vm." Here, ηmin is a smallest free-flight distance set in step S612 and is infinite if it has not been presented. Step S650 sets no thermal vibration displacement for atoms with no collision possibility even with the predetermined large thermal vibration displacement Vm, so that for such an atom, step S607 may not set and store a thermal vibration displacement. If pmax=d/2 and Vm=d/10, then a range 21 of FIG. 13 where atoms for which thermal vibration displacements must be set are present is restricted to a radius of d/2+d/10=1.2×d/2 around a travelling direction axis of the trial particle 23. Atoms in the range 21 are stored as collision candidate atoms. The area of the range 21 is $\pi(1.2\times d/2)^2 \approx 4.52\times(d/2)^2$, which is about half the thermal vibration displacement setting range 22 (FIG. 3) of the prior art ranging from $8.14\times(d/2)^2$ to $9.38\times(d/2)^2$. Namely, the third embodiment can reduce the number of atoms for which thermal vibration displacements are set to about half that of the prior art.

(VIII) In step S607, the displacement setter 11 sets a thermal vibration displacement Di for the collision candidate atom i and stores the set data in the data storage 3.

(IX) Step S610 calculates a collision parameter $pi=|(Ti+Di-P)\times\lambda|$ and a free-flight distance $\eta i=|(Ti+Di-P)\cdot\eta|$ according to the location Ti+Di of the collision candidate atom i.

(X) Step S611 checks to see if the collision parameter pi of the collision candidate atom i is smaller than the predetermined maximum collision parameter pmax and if the free-flight distance ηi is smaller than the minimum free-flight distance η min. If step S611 is "YES," step S612 is carried out. If step S611 is "NO," step S613 is carried out.

More precisely, step S611 checks to see if the collision candidate atom i having the location Ti+Di satisfies the following:

$pi<pmax$ with $pi=|(Ti+Di-P)\times\lambda|$ $0<\eta i<\eta min$ with $\eta i=|(Ti+Di-P)\cdot\lambda|$ (XI) Step S612 updates a collision atom to the atom i and the minimum free-flight distance ηmin to the free-flight distance ηi of the atom i.

(XII) Step S613 checks to see if every collision candidate atom has been picked up in step S605. Namely, step S613 checks to see if each of the collision candidate atoms 1 to n has been processed. If step S613 is "NO," step S605 is repeated to pick up the next collision candidate atom as an atom i. If step S613 is "YES," step S700 of FIG. 7 is carried out.

According to the third embodiment, step S650, which is carried out before step S607 of setting and storing thermal vibration displacements, checks to see if a given collision candidate atom has a possibility of collision if a predetermined large thermal vibration displacement is set for the atom, so that a thermal vibration displacement is set for the atom only when necessary. This further reduces the number of atoms for which collision parameters and free-flight distances are calculated. This technique is particularly effective when the direction finding step of step S603 is omitted to increase the number of collision candidate atoms obtained in step S604.

The Monte Carlo ion implantation simulation method of any one of the first to third embodiments may be expressed as a series of processes, operations, or procedures. Namely, the simulation method can be realized in a computer program executable by a computer system to control the functions of, for example, a processor of the computer system. The computer program may be stored in a computer readable storage medium, which may be used as or written into the program storage 2 of FIG. 6. The program carries out the operations of the process controller 1 (FIG. 6) according to predetermined sequences. The storage medium may be a semiconductor memory such as a ROM and a RAM, a magnetic disk, an optical disk, and a magnetic tape.

Figure 14:
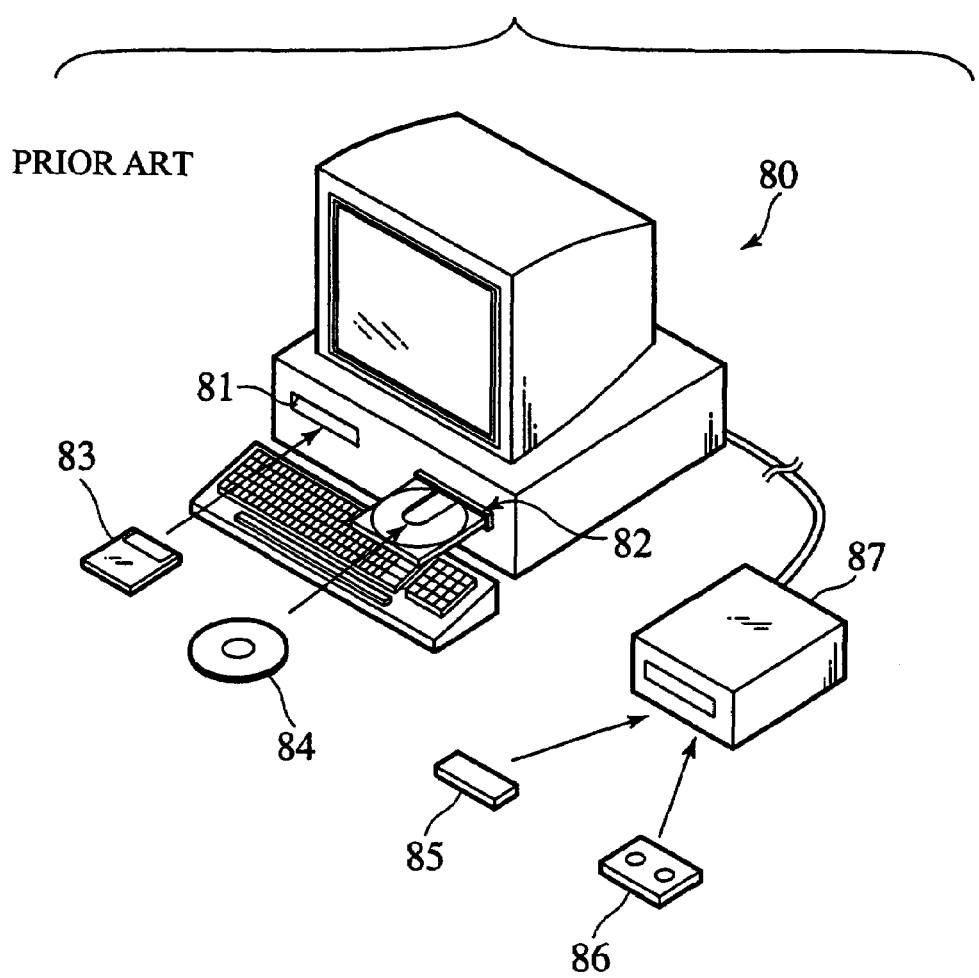
FIG. 14 is a perspective view showing an example of a Monte Carlo ion implantation simulator involving a computer system that reads a simulation program from a storage medium and executes an ion implantation simulation according to procedures described in the program.

FIG. 14 is a perspective view showing an example of a Monte Carlo ion implantation simulator 80 involving a computer system that reads a simulation program from a storage medium and executes an ion implantation simulation according to procedures stipulated in the program. The computer system 80 has a floppy disk drive 81 to receive a magnetic floppy disk 83 and a CD-ROM drive 82 to receive an optical CD-ROM 84. The disks 83 and 84 contain computer programs that are read by and installed in the computer system 80. The computer system 80 may be connected to a drive unit 87 that handles, for example, a ROM 85 that is a semiconductor memory used for, for example, a game pack and a magnetic cassette tape 86.

Fourth Embodiment

Figure 15:
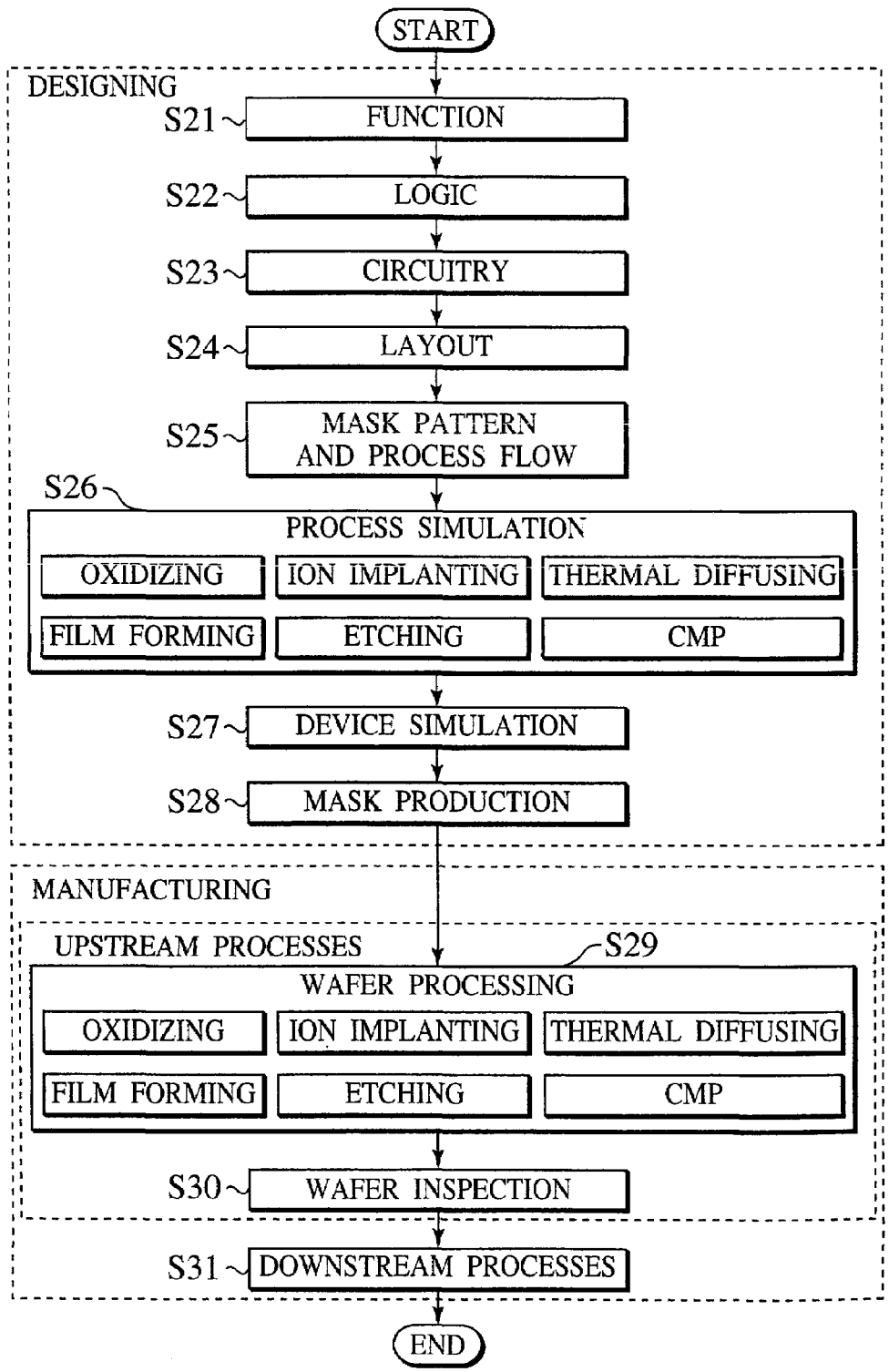
FIG. 15 is a flowchart showing a semiconductor device manufacturing method according to a fourth aspect of the present invention involving an ion implantation process that relies on a simulation result of any one of the first to third embodiments.

FIG. 15 is a flowchart showing a semiconductor device manufacturing method according to the fourth embodiment of the present invention involving an ion implantation process that is based on a simulation result of any one of the first to third embodiments.

(1) In function designing step S21, functions of a semiconductor device to be manufactured are clarified according to expected input/output data, logic, memories, I/O circuits, etc.

(2) In logic designing step S22, electronic circuits (logic circuits) to realize the functions are designed. A circuit simulation is carried out on the designed logic circuits, to test the performance of the semiconductor device. A result of the simulation is fed back into the logic designing step to correct errors in the logic circuits.

(3) In circuit designing step S23, the logic circuits are replaced with transistor basic circuits. As in the logic designing, the circuit designing is tested by a simulation, and a result of the simulation is fed back to the circuit designing.

(4) In layout designing step S24, a layout of the semiconductor device is designed determining transistor locations and wiring on a semiconductor chip. More precisely, an operator enters transistor circuit diagrams into an automatic layout tool, which provides layout patterns that secure required performance and minimize a chip area. The designed layout patterns are tested for conformity with the circuit diagrams, and a rule checker is used to check for violations of electric and design rules.

(5) In step S25, mask patterns and process flows including manufacturing procedures and conditions are designed according to the designed transistor shapes and layout patterns.

(6) In step S26, a process simulation is carried out to simulate processes of manufacturing the semiconductor device from a semiconductor substrate. This simulation provides data about impurity distributions in the semiconductor device, the geometries of the semiconductor device, etc. The manufacturing processes are simulated separately, and results of the simulations are fed back to the mask pattern and process flow designing, to correct errors in the mask patterns and process flows. The manufacturing processes to be simulated include oxidation, ion implantation, thermal diffusion, film formation, etching, CMP, etc. In these processes, the ion implantation process simulation is carried out according to any one of the first to third embodiments of the present invention. To reduce a computation time, one of the first to the third embodiments of the present invention may be used to provide distribution parameters, which are used for an analytic model simulation. More precisely, there are two approaches to simulating an implanted ion distribution, one is the Monte Carlo simulation of two-body collision approximation and the other is the analytic model simulation. The Monte Carlo simulation has versatility for target shapes and implanting conditions and high accuracy but needs a long computation time. The analytic model simulation forms a concentration distribution according to distribution parameters including the center positions of implanted impurity distributions and standard deviations and needs a shorter time than the Monte Carlo simulation. However, the analytic model simulation must acquire the distribution parameters from the Monte Carlo simulation, or from experiments.

(7) In step S27, a result of the process simulation is used in a device simulation to test the electric characteristics of the semiconductor device. If the performance of the semiconductor device is unacceptable, the test result is fed back to steps S21 to S25 and these steps are repeated.

(8) In step S28, the designed mask patterns are used to prepare masks (reticles) that are five to ten times larger than actual sizes. Steps S21 to S28 complete a designing stage, and a manufacturing stage begins from step S29.

(9) In step S29, semiconductor wafers are fed into a manufacturing line. The prepared masks are used to carry out oxidation, ion implantation, thermal diffusion, film formation, etching, CMP, etc., on each wafer according to the designed process flows.

(10) In step S30, probes are attached to electrode pads of semiconductor chips on each wafer, to test the electric characteristics of the chips.

(11) In step S31, each wafer is cut into semiconductor chips. Each semiconductor chip successfully passed through the test is fixed to a lead flame and is electrically connected to bonding wires. Epoxy resin, ceramics, etc., are used to cover the semiconductor chip, lead frame, and bonding wires to protect them from environments, thereby completing the semiconductor device.

In this way, the fourth embodiment quickly determines conditions for the ion implantation process according to a result of the Monte Carlo ion implantation simulation using any one of the first to third embodiments of the present invention. A result of the simulation is fed back into the designing stage, minimizing errors. Consequently, the semiconductor device manufacturing method of the present invention minimizes designing and developing periods.

Although the fourth embodiment feeds a result of the ion implantation simulation back into the designing of mask patterns and process flows, this does not limit the present invention. For example, the simulation result may be fed back into the layout designing or circuit designing.

Additional advantages and modifications of the present invention will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A Monte Carlo ion implantation simulation method comprising:

entering a structure of a target having a monocrystal area, ion implanting conditions, and a number of trial particles;

implanting said trial particles, as ions to be implanted, into said target; and performing a Monte Carlo simulation with respect to said implanted trial particles by performing the steps of:

finding, for each implanted trial particle that is in said monocrystal area, a unit cell in which said each implanted trial particle is present and finding a basic cell in which said each implanted trial particle is present among basic cells that form said unit cell;

finding a directional range in which said each implanted trial particle travels;

obtaining collision candidate atoms with their locations from a database according to said found basic cell and said directional range;

setting a thermal vibration displacement for each of said collision candidate atoms that have not set thermal vibration displacement;

calculating a collision parameter and free-flight distance for each of said collision candidate atoms;

selecting, as a collision atom, one of said collision candidate atoms that has a collision parameter smaller than a predetermined maximum collision parameter and a smallest positive free-flight distance; and calculating a collision between said each implanted trial particle and said collision atom to find a after-collision location and momentum of said each implanted trial particle, wherein said collision candidate atoms include:

atoms each satisfying "p<pmax−Vm" and "η>Vm" and having a smallest free-flight distance (η=ηmin); and atoms each satisfying "p<pmax+Vm" and "−Vm<η<ηmin+Vm" where p is a collision parameter with respect to said atom's vibration center, η a free-flight distance, pmax a maximum collision parameter, and Vm a predetermined large thermal vibration displacement; and implanting ions into a semiconductor device based on results of the Monte Carlo simulation.

2. The method of claim 1, wherein:

a collision point between any one of said collision candidate atoms and said each implanted trial particle is in said basic cell in which said each implanted trial particle is present.

3. The method of claim 1, wherein:

said collision candidate atoms include atoms each having collision point with said each implanted trial particle that is outside said basic cell in which said each implanted trial particle is present.

4. The method of claim 1, wherein:

setting a thermal vibration displacement for each obtained collision candidate atom having not set thermal vibration displacement comprises determining whether or not said atom has a possibility of collision with said each implanted trial particle if a predetermined large thermal vibration displacement is set for said atom, and if said atom has collision possibility, setting said thermal vibration displacement for said atom;

calculating a collision parameter and free-flight distance comprises calculating such collision parameter and free-flight distance for each obtained collision candidate atom having a thermal vibration displacement; and determining a collision atom comprises selecting, as said collision atom, one of said collision candidate atoms that has a thermal vibration displacement, a collision parameter smaller than said maximum collision parameter, and a smallest positive free-flight distance.

5. A Monte Carlo ion implantation simulator system comprising:

an input device for entering a structure of a target having a monocrystal area, ion implanting conditions, and a number of trial particles;

an initiator for implanting said trial particles, as ions to be implanted, into said target; and a Monte Carlo Simulator that comprises:

a location finder for finding, for each implanted trial particle that is in said monocrystal area, a unit cell in which said each implanted trial particle is present and finding a basic cell in which said each implanted trial particle is present among basic cells that form said unit cell;

a direction finder for finding a directional range in which said each implanted trial particle travels;

a database storing collision candidate atoms with their locations in said basic cells;

a candidate obtainer for obtaining collision candidate atoms with their locations from said database according to said found basic cell and directional range;

a displacement setter for selling a thermal vibration displacement for each of said collision candidate atoms that have not set thermal vibration displacement;

a parameter calculator for calculating a collision parameter and free-flight distance for each of said collision candidate atoms;

a collision atom selector for selecting, as a collision atom, one of said collision candidate atoms that has a collision parameter smaller than a predetermined maximum collision parameter and a smallest positive free-flight distance; and a collision calculator for calculating a collision between said each implanted trial particle and said collision atom to find a after-collision location and momentum of said each implanted trial particle, wherein said collision candidate atoms include:

atoms each satisfying "p<pmax−Vm" and "η>Vm" and having a smallest free-flight distance (η=ηmin); and atoms each satisfying "p<pmax+Vm" and "−Vm<η<ηmin+Vm" where p is a collision parameter with respect to said atom's vibration center T, η a free-flight distance, pmax a maximum collision parameter, and Vm a predetermined large thermal vibration displacement; and implanting ions into a semiconductor device based on results of the Monte Carlo simulation.

6. The simulator system of claim 5, wherein:

a collision point between a vibration center of any one of said collision candidate atoms and said each implanted trial particle is in said basic cell in which said each implanted trial particle is present.

7. The simulator system of claim 5, wherein:

said collision candidate atoms include atoms each having a vibration center whose collision point with said each implanted trial particle is outside said basic cell in which said each implanted trial particle is present.

8. The simulator system of claim 5, wherein:

said displacement setter comprises a unit for determining whether or not a given one of said collision candidate atoms has a possibility of collision with said each implanted trial particle if a predetermined large thermal vibration displacement is set for said atom, and a unit for setting a thermal vibration displacement for said atom having such a collision possibility;

said parameter calculator calculates a collision parameter and free-flight distance for each obtained collision candidate atom having a thermal vibration displacement; and said collision atom selector selects, as said collision atom, one of said collision candidate atoms that has a thermal vibration displacement, a collision parameter smaller than said maximum collision parameter, and a smallest positive free-flight distance.

9. The simulator system of claim 5, further comprising:

data storage for storing a thermal vibration displacement set for a collision candidate atom, so that a thermal vibration displacement may not be set again for said same collision candidate atom.

10. A computer program product, on a computer readable medium, that when executed on a computer provides for a Monte Carlo ion implantation simulation, the program product comprising:

code for entering a structure of a target having a monocrystal area, ion implanting conditions, and a number of trial particles;

code for implanting said trial particles into said target;

code for finding, for each implanted trial particle that is in said monocrystal area, a unit cell in which said each implanted trial particle is present and finding a basic cell in which said each implanted trial particle is present among basic cells that form said unit cell;

code for finding a directional range in which said each implanted trial particle travels;

code for obtaining collision candidate atoms with their locations from a database according to said found basic cell and directional range;

code for setting a thermal vibration displacement for each of said collision candidate atoms that have not set thermal vibration displacement;

code for calculating a collision parameter and free-flight distance for each of said collision candidate atoms;

code for selecting, as a collision atom, one of said collision candidate atoms that has a collision parameter smaller than a predetermined maximum collision parameter and a smallest positive free-flight distance; and code for calculating a collision between said each implanted trial particle and said collision atom to find a after-collision location and momentum of said each implanted trial particle, wherein said collision candidate atoms include:

atoms each satisfying "p<pmax−Vm" and "η>Vm" and having a smallest free-flight distance (η=ηmin); and atoms each satisfying "p<pmax+Vm" and "−Vm<η<ηmin+Vm" where p is a collision parameter with respect to said atom's vibration center T, η a free-flight distance, pmax a maximum collision parameter, and Vm a predetermined large thermal vibration displacement.

11. The computer program product of claim 10, wherein:

a collision point between a vibration center of any one of said collision candidate atoms and said each implanted trial particle is in said basic cell in which said each implanted trial particle is present.

12. The computer program product of claim 10, wherein:

said collision candidate atoms include atoms each having a vibration center whose collision point with said each implanted trial particle is outside said basic cell in which said each implanted trial particle is present.

13. The computer program product of claim 10, wherein said program product further comprises:

code for setting a thermal vibration displacement for each obtained collision candidate atom having not set thermal vibration displacement comprises determining whether or not said atom has a possibility of collision with said each implanted trial particle if a predetermined large thermal vibration displacement is set for said atom, and if said atom has said collision possibility, setting a thermal vibration displacement for said atom;

code for calculating a collision parameter and free-flight distance comprises calculating such collision parameter and free-flight distance for each obtained collision candidate atom having a thermal vibration displacement; and code for determining a collision atom comprises selecting, as said collision atom, one of said collision candidate atoms that has a thermal vibration displacement, a collision parameter smaller than said maximum collision parameter, and a smallest positive free-flight distance.

14. A method of manufacturing a semiconductor device, comprising:

carrying out a Monte Carlo ion implantation simulation that includes:

entering a structure of a target having a monocrystal area, ion implanting conditions, and a number of trial particles;

implanting said trial particles into said target;

finding, for each implanted trial particle that is in said monocrystal area, a unit cell in which said each implanted trial particle is present and finding a basic cell in which said each implanted trial particle is present among basic cells that form said unit cell;

finding a directional range in which said each implanted trial particle travels;

obtaining collision candidate atoms with their locations from a database according to said found basic cell and directional range;

setting a thermal vibration displacement for each of said collision candidate atoms that has not set thermal vibration displacement;

calculating a collision parameter and free-flight distance for each of said collision candidate atoms;

selecting, as a collision atom, one of said collision candidate atoms that has a collision parameter smaller than a predetermined maximum collision parameter and a smallest positive free-flight distance; and calculating a collision between said each implanted trial particle and said collision atom to find a after-collision location and momentum of said each implanted trial particle;

calculating an implanted ion distribution in said semiconductor device according to data provided by said Monte Carlo ion implantation simulation;

designing process conditions for said semiconductor device according to said calculated implanted ion distribution; and carrying out a series of wafer processes including an ion implanting process according to said designed process conditions, wherein said collision candidate atoms include:

atoms each satisfying "p<pmax−Vm" and "η>Vm" and having a smallest free-flight distance (η=ηmin); and atoms each satisfying "p<pmax+Vm" and "−Vm<η<ηmin+Vm" where p is a collision parameter with respect to said atom's vibration center T, η a free-flight distance, pmax a maximum collision parameter, and Vm a predetermined large thermal vibration displacement.

15. The method of claim 14, wherein:
a collision point between a vibration center of any one of said collision candidate atoms and said each implanted trial particle is in said basic cell in which said each implanted trial particle is present.

16. The method of claim 14, wherein:
said collision candidate atoms include atoms each having a vibration center whose collision point with said each implanted trial particle is outside said basic cell in which said each implanted trial particle is present.

17. The method of claim 14, wherein:
setting a thermal vibration displacement for each obtained collision candidate atom having not set thermal vibration displacement comprises determining whether or not said atom has a possibility of collision with said each implanted trial particle if a predetermined large thermal vibration displacement is set for said atom, and if said atom has said collision possibility, setting a thermal vibration displacement for said atom;
calculating a collision parameter and free-flight distance comprises calculating such collision parameter and free-flight distance for each obtained collision candidate atom having a thermal vibration displacement; and
determining a collision atom comprises selecting, as said collision atom, one of said collision candidate atoms that has a thermal vibration displacement, a collision parameter smaller than said maximum collision parameter, and a smallest positive free-flight distance.

18. The method of claim 1, further comprising:
determining whether said each trial particle has stopped after colliding with one of said collision candidate atoms;
if the determining step determines that said each trial particle has not stopped, looping back to the first finding step and repeating the steps thereafter; and
if the determining step determines that said each trial particle has stopped, storing a stopped location of said each trial particle in a data storage, and ending the Monte Carlo ion implantation simulation method.

19. The method according to claim 18, wherein each unit cell is divided up into $8^3$ basic cells, by dividing each side of said each unit cell by 8.

20. The method according to claim 18, wherein each unit cell is divided up into a plurality of basic cells, the method further comprising:
obtaining collision candidate atoms that have a respective collision point outside said basic cell in which said each implanted trial particle is located.

\* \* \* \* \*